US007710289B2

(12) United States Patent
Liu et al.

(10) Patent No.: US 7,710,289 B2
(45) Date of Patent: May 4, 2010

(54) PORTABLE COMMUNICATION APPARATUS WITH AN ANTI-THEFT MODE AND IMPLEMENTING METHOD THEREOF

(75) Inventors: Fang-Hua Liu, Shenzhen (CN); Shih-Fang Wong, Taipei Hsien (TW)

(73) Assignees: Hong Fu Jin Precision Industry (ShenZhen) Co., Ltd., Shenzhen, Guangdong Province (CH); Hon Hai Precision Industry Co., Ltd., Tu-Cheng, Taipei Hsien (TW)

(*) Notice: Subject to any disclaimer, the term of this patent is extended or adjusted under 35 U.S.C. 154(b) by 393 days.

(21) Appl. No.: 11/769,731

(22) Filed: Jun. 28, 2007

(65) Prior Publication Data

US 2008/0001740 A1 Jan. 3, 2008

(30) Foreign Application Priority Data

Jun. 28, 2006 (CN) ........................ 2006 1 0061363

(51) Int. Cl.

*G08B 3/00* (2006.01)
*G08B 25/08* (2006.01)
*H04L 9/32* (2006.01)
*H04M 1/66* (2006.01)

(52) U.S. Cl. .................. 340/691.1; 340/692; 340/5.31; 340/5.74; 455/410; 455/411; 455/412.1

(58) Field of Classification Search .............. 340/691.1
See application file for complete search history.

(56) References Cited

U.S. PATENT DOCUMENTS

| | | | | |
|---|---|---|---|---|
| 5,257,412 | A * | 10/1993 | Tomioka et al. | 455/411 |
| 5,796,338 | A | 8/1998 | Mardirossian | |
| 6,138,005 | A * | 10/2000 | Park | 455/411 |
| 6,314,283 | B1 * | 11/2001 | Fielden | 455/411 |
| 6,662,023 | B1 * | 12/2003 | Helle | 455/558 |

* cited by examiner

*Primary Examiner*—Donnie L Crosland
(74) *Attorney, Agent, or Firm*—Frank R. Niranjan

(57) ABSTRACT

A communication apparatus with an anti-theft mode is provided. A preferred embodiment of the apparatus includes an input unit and a CPU. The input unit is for generating an operational signal in response to an operational input. The CPU is for receiving an anti-theft mode signal and setting the communication apparatus in an anti-theft mode, and disabling communication functions of the communication apparatus when the operational signal received from the input unit is a communication operational signal and the communication apparatus is in the anti-theft mode.

10 Claims, 5 Drawing Sheets

PORTABLE COMMUNICATION APPARATUS WITH AN ANTI-THEFT MODE AND IMPLEMENTING METHOD THEREOF

BACKGROUND OF THE INVENTION

1. Field of the Invention

The present invention relates to a communication apparatus with an anti-theft mode and an implementing method of the communication apparatus with an anti-theft mode.

2. Description of Related Art

As portable communication apparatus become smaller and lighter, it becomes more susceptible to being misplaced and/or stolen.

When a portable communication apparatus is stolen and used maliciously, the extra charges incurred are typically charged to the owner of the communication apparatus. Accordingly, when the communication apparatus is stolen, it is desirable that malicious usage of the communication apparatus are prevented.

There is an electronic lock that facilitates the locking of communication apparatus to prevent malicious usage. Before the communication apparatus can be used, a lock code must be manually inputted so as to unlock the communication apparatus. However, locking and unlocking the communication apparatus is very troublesome. For this reason, many communication apparatus users do not bother locking them. Therefore, if the communication is stolen, the malicious use of the communication apparatus cannot be prevented.

Therefore, what is still needed is a communication apparatus with an anti-theft mode and when the communication apparatus in the anti-theft mode, to prevent malicious use of communication apparatus.

SUMMARY OF THE INVENTION

A communication apparatus with an anti-theft mode is provided. A preferred embodiment of the apparatus includes an input unit and a CPU. The input unit is for generating an operational signal in response to an operational input. The CPU is for receiving an anti-theft mode signal and setting the communication apparatus in an anti-theft mode, and disabling communication functions of the communication apparatus when the operational signal received from the input unit is a communication operational signal and the communication apparatus is in the anti-theft mode.

An implementing method for a communication apparatus with an anti-theft mode is provided. The implementing method includes the step of: receiving an anti-theft mode signal; setting the communication apparatus in an anti-theft mode; receiving an operational signal; and disable communication functions of the communication apparatus when the operational signal is a communication operational signal.

Other advantages and novel features will be drawn from the following detailed description of the preferred embodiment with reference to the attached drawings.

DETAILED DESCRIPTION OF THE INVENTION

In a preferred embodiment of the present invention, a portable communication apparatus (hereinafter, "the apparatus") has a general mode and an anti-theft mode. The general mode and the anti-theft mode can be switched by user's operation. In the general mode, all functions of the apparatus are in a normal state. In the anti-theft mode, voice and message communication functions of the apparatus are in an anti-theft state, while the other functions are still in the normal state. A detailed implementing method of the preferred embodiment is described herein.

Figure 1:
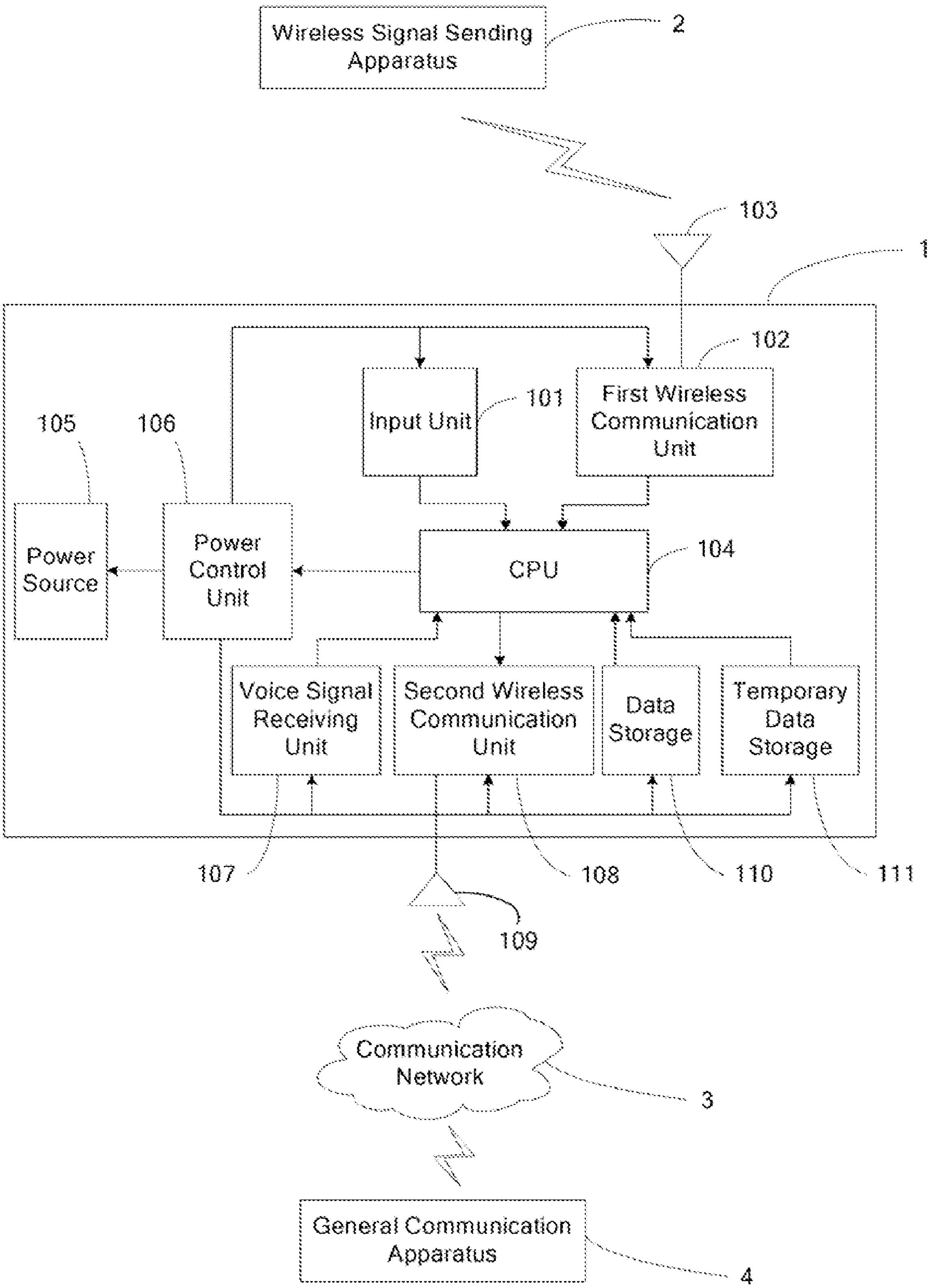
FIG. 1 is an exemplary hardware infrastructure diagram of a portable communication apparatus with an anti-theft mode in accordance with a preferred embodiment of the present invention.

FIG. 1 is an exemplary hardware infrastructure diagram of the apparatus in accordance with the preferred embodiment of the present invention. The apparatus 1 includes an input unit 101, a first wireless communication unit 102, a first antenna 103, a CPU 104, a power source 105, a power control unit 106, a voice signal receiving unit 107, a second wireless communication unit 108, a second antenna 109, a data storage 110, and a temporary data storage 111.

The apparatus 1 further defines a state value that indicates a current mode of the apparatus. For example, when the state value is "0", it indicates the current mode of the apparatus 1 is the general mode, when the state value is "1", it indicates the current mode of the apparatus 1 is the anti-theft mode.

The antenna 103 is provided for receiving an anti-theft mode signal transmitted from a wireless signal transmitting apparatus 2. The anti-theft mode signal is generated by the wireless signal transmitting apparatus 2 for response to a lock operation input of the user. When the anti-theft mode signal is received, the antenna 103 transmits the anti-theft mode signal to the CPU 104 through the first wireless communication unit 102. When the CPU 104 receives the anti-theft mode signal, the CPU 104 changes the state value from "0" to "1" and changes the mode of the apparatus 1 from the general mode to the anti-theft mode. In the anti-theft mode, the CPU 104 disables the voice and message communication functions. The CPU 104 signals the power control unit 106 to discontinue supplying power from the power source 105 to the voice receiving unit 107, suspends receiving voice signal from the voice signal receiving unit 107, or suspends sending the voice signals received from the voice receiving unit 107 to the general communication apparatus 4 to disable the voice communication function. To disable the message communication functions, the CPU 104 does not send the text file edited by users and stored in the temporary data storage 111. Furthermore, the anti-theft mode signal can also be generated and sent to the 104 by the input unit 101 after the lock operation input.

Once receiving an unlock signal, the CPU 104 changes the state value from "1" to "0", and switches the current mode from the anti-theft mode to the general mode. That is, the CPU 104 enables the voice and message communication functions to revert to the activate state.

In addition, while in the anti-theft mode, when a voice communication instruction is received from the input unit 101, the CPU 104 sends a network connection instruction to establish a connection between the apparatus 1 and the general communication apparatus 4. Subsequently, the CPU 104 obtains a prerecorded voice file from the data storage 110 and transmits the prerecorded voice file to the second wireless communication unit 108, the second wireless communication unit 108 then sends the prerecorded voice file to the general communication apparatus 4 through the second antenna 109 and a communication network 3. The content of the prerecorded voice file can be "device has been stolen" or other content that alerts people that the user of the apparatus 1 is not the original owner of the apparatus 1.

When receiving a message communication instruction from the input unit 101, the CPU 104 obtains a prerecord message file from the data storage 110 instead of a message file stored in the temporary data storage 111. The prerecord message is then transmitted to the second wireless communication unit 108. The second wireless communication unit 108 sends the prerecord message to the portable communication apparatus 3 through the second antenna 109 and the communication network 4. The content of the prerecord message file can be "device has been stolen" or other content that alerts people that the holder of the apparatus 1 is not the original owner of the apparatus 1.

Figure 2:
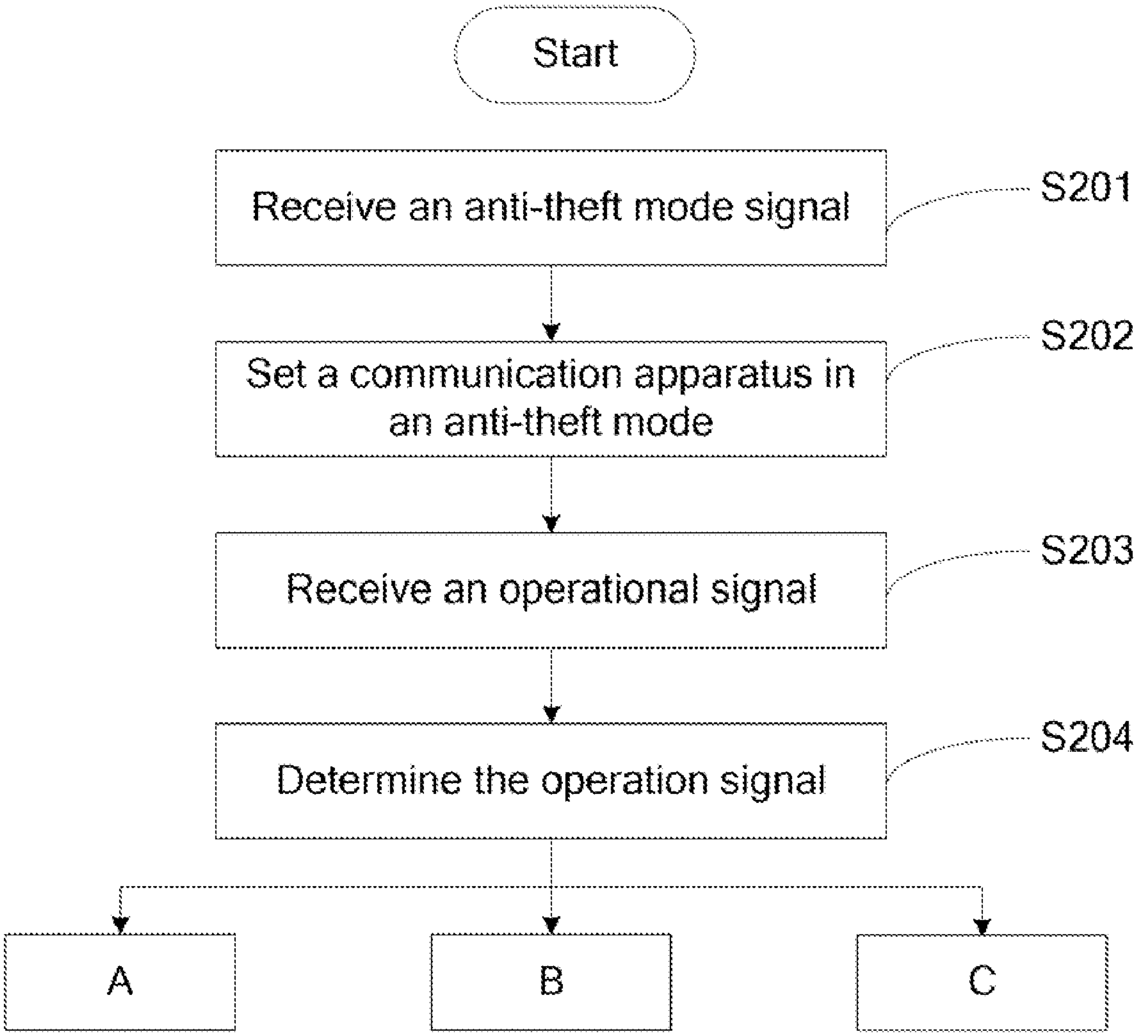
FIG. 2 is a flow chart of an implementing method of the portable electronic apparatus with an anti-theft mode.

FIG. 2 is a flow chart of an implementing method of the portable electronic apparatus with an anti-theft mode.

In step S201, the CPU 104 receives the anti-theft mode signal which transmitted from the wireless signal sending apparatus 2 or the input unit 101.

In step S202, the CPU 104 sets the apparatus 1 in the anti-theft mode according to the anti-theft mode signal.

In step S203, the CPU 104 receives the operational signal from the input unit 101.

In step S204, the CPU 104 determines the operational signal. If the operational signal is the voice operational signal, the procedure goes to procedure A. If the operation signal is the message operational signal, the procedure goes to procedure B. If the operation signal is the general operation signal, the procedure goes to procedure C.

Figure 3:
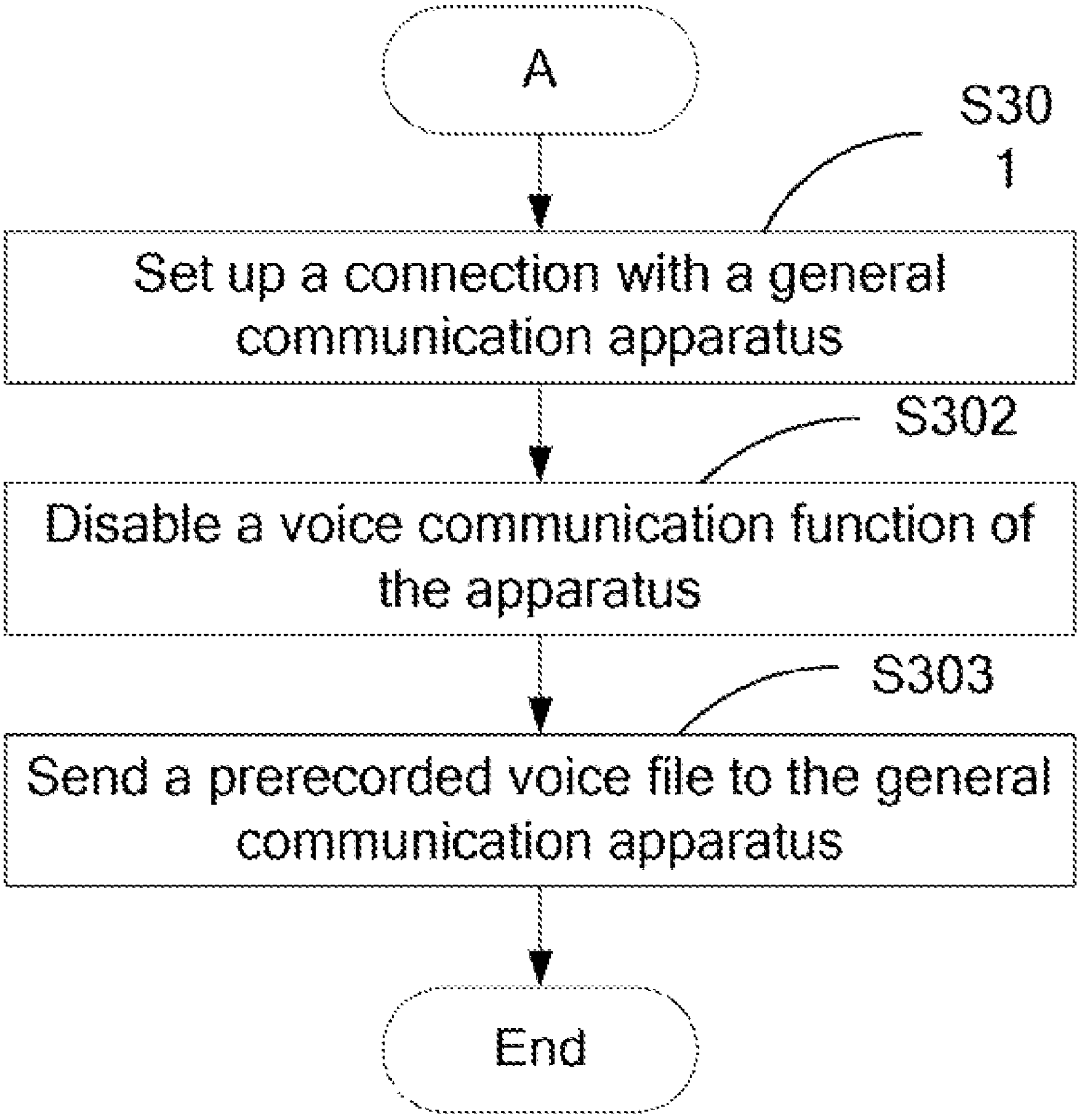
FIG. 3 is a flow chart of procedure A of FIG. 2 when an operational signal is a voice communication signal.

FIG. 3 is a flow chart of the procedure A when the operation signal is the voice communication signal.

In step S301, the CPU 104 sends the network connection instruction to establish a connection between the apparatus 1 and the general communication apparatus 4.

In step S302, the CPU 104 disables the voice communication function of the apparatus 1.

In step S303, the CPU 104 obtains the prerecorded voice file from the data storage 110 and then sends the prerecorded voice file to the general communication apparatus 4.

Figure 4:
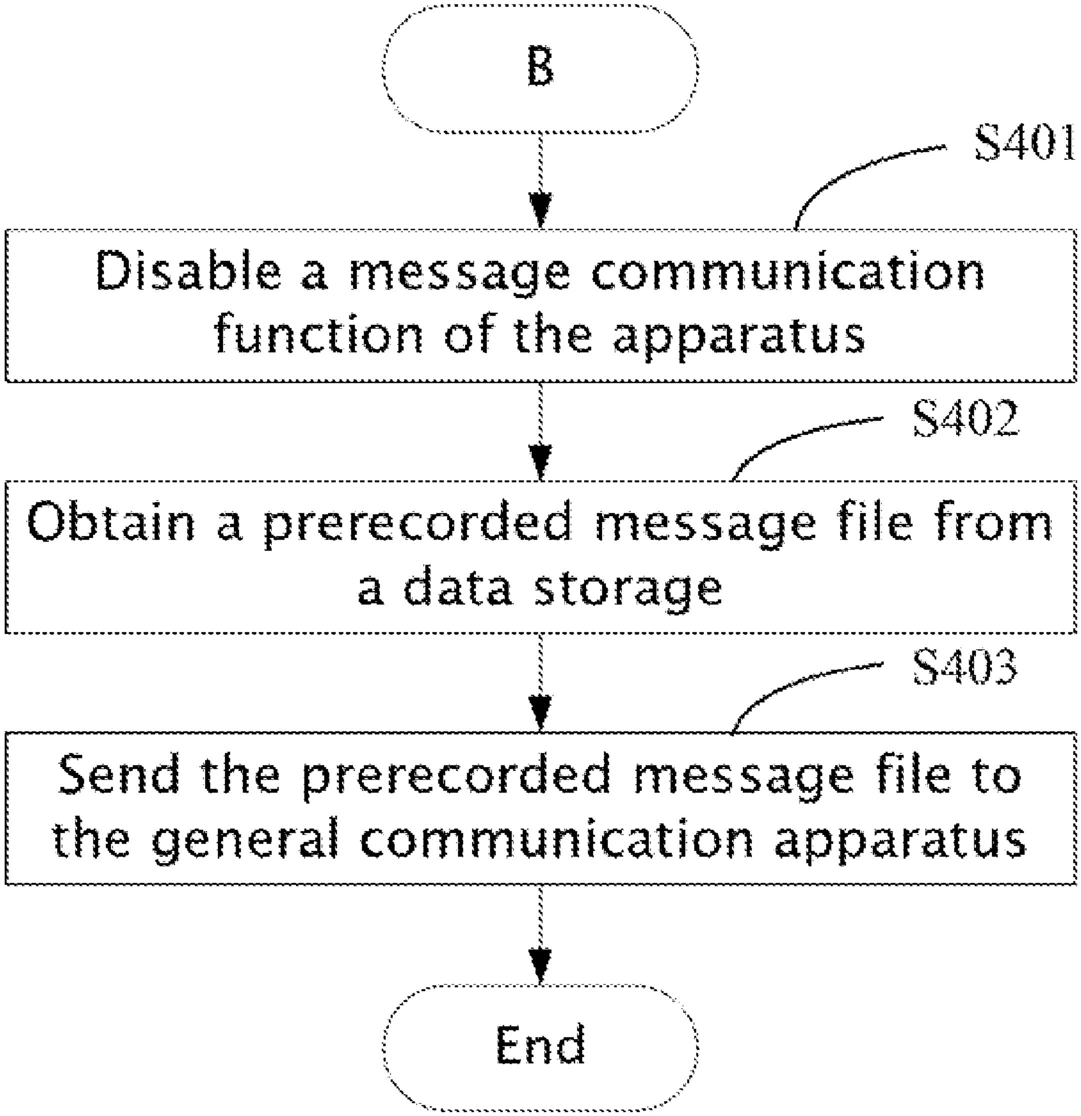
FIG. 4 is a flow chart of procedure B of FIG. 2 when an operation signal is a message communication signal.

FIG. 4 is a flow chart of the procedure B when the operation signal is the message communication signal.

In step S401, the CPU 104 disables the message communication function.

In step S402, the CPU 104 obtains a prerecorded message file from the data storage 110.

In step S403, the CPU 104 sends the prerecorded message file to general communication apparatus 4.

Figure 5:
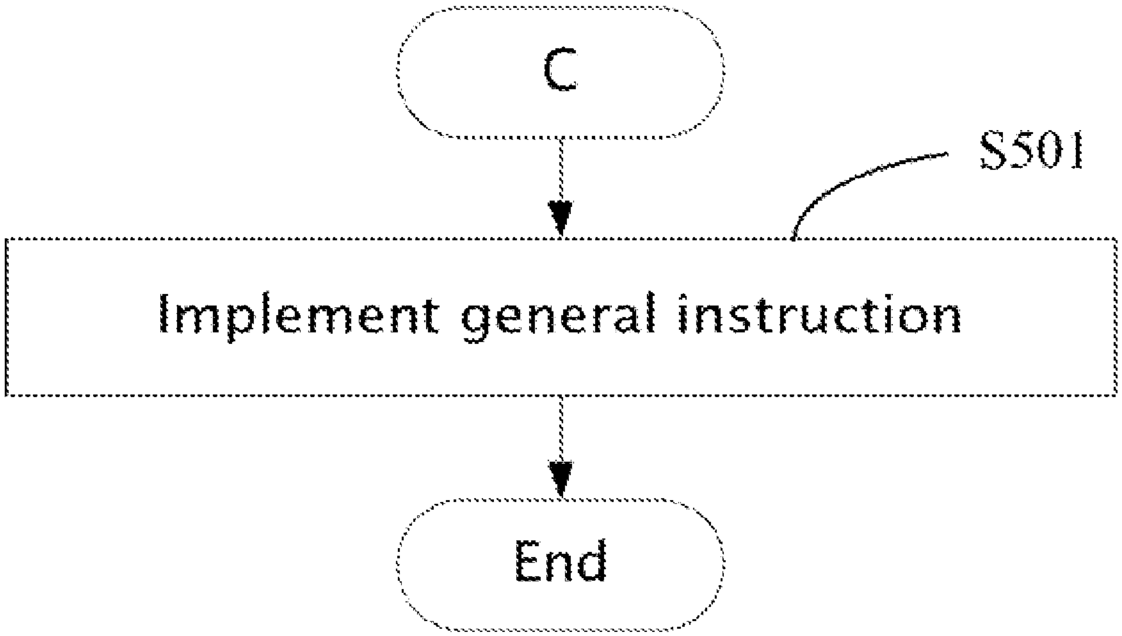
FIG. 5 is a flow chart of procedure C of FIG. 2 when an operation signal is a general operation signal.

FIG. 5 is a flow chart of the procedure C when the operation signal is the general operation signal.

In step S501, the CPU 104 implements the general instruction.

Although the present invention has been specifically described on the basis of a preferred embodiment, the invention is not to be construed as being limited thereto. Various changes or modifications may be made to the embodiment without departing from the scope and spirit of the invention as recited in the claims and equivalents thereof.

What is claimed is:

1. A communication apparatus with a general mode and an anti-theft mode, wherein in the general mode, all functions of the communications apparatus are in a normal state; the communication apparatus comprising:

an input unit for generating an operational signal in response to an operational input;

a CPU for receiving an anti-theft mode signal and setting the communication apparatus in an anti-theft mode, and disabling voice and message communication functions of the communication apparatus, while the other functions are still in the normal state, the operational signal received from the input unit is a communication operational signal, and the communication apparatus is in the anti-theft mode; and a data storage for storing a prerecorded voice file or a prerecorded message file; wherein, the CPU obtains the prerecorded voice file from the data storage and sends the prerecorded voice file to a general communication apparatus when the communication operational signal is a voice communication signal in the anti-theft mode; and the CPU obtains the prerecorded message file from the data storage and sends the prerecorded message file to a general communication apparatus when the communication operational signal is a message communication signal in the anti-theft mode.

2. The apparatus as described in claim 1, wherein the anti-theft mode signal is generated from the input unit in response to a lock operation input.

3. The apparatus as described in claim 2, further comprising a first wireless communication unit for receiving the anti-theft mode signal from a wireless signal transmitting apparatus.

4. The apparatus as described in claim 3, further comprising a power control unit and a voice signal receiving unit, wherein the CPU signals the power control unit to discontinue supplying power to the voice receiving unit to disable the voice communication function.

5. The apparatus as described in claim 4, further comprising a voice signal receiving unit, wherein the CPU suspends receiving voice signals from the voice signal receiving unit, or suspends sending the voice signals received from the voice receiving unit to a general communication apparatus to disable the voice communication function.

6. The apparatus as described in claim 5, further comprising a temporary data storage that records a file edited by user, wherein the CPU does not send the text file edited by user and stored in the temporary data storage to disable the message communication function.

7. An implementing method for a communication apparatus with a general mode and an anti-theft mode, wherein the communication apparatus stores a prerecorded voice file or a prerecorded message file, and in the general mode, all functions of the communications apparatus are in a normal state; the method comprising:

receiving an anti-theft mode signal;

setting the communication apparatus in an anti-theft mode;

receiving an operational signal;

disabling voice and message communication functions of the communication apparatus while the other functions are still in the normal state, and the operational signal is a communication operational signal; and obtaining the prerecorded voice file and sending the prerecorded voice file to a general communication apparatus when the communication operational signal is a voice communication signal in the anti-theft mode; or obtaining the prerecorded message file and sending the prerecorded message file to a general communication apparatus when the communication operational signal is a message communication signal in the anti-theft mode.

8. The method as described in claim 7, further comprising the step of generating the anti-theft mode signal from the input unit in response to a lock operation input of a user.

9. The method as described in claim 8, further comprising the step of receiving the anti-theft mode signal from a wireless signal sending device.

10. The method as described in claim 9, wherein the disabling step further comprises the step of signaling a power control unit of the communication apparatus to discontinue supplying power to the voice receiving unit to disable the voice communication function

* * * * *